(12) United States Patent
Alon et al.

(10) Patent No.: US 12,333,775 B2
(45) Date of Patent: Jun. 17, 2025

(54) EFFICIENT NEURAL NETWORKS VIA ENSEMBLES AND CASCADES

(71) Applicant: Google LLC, Mountain View, CA (US)

(72) Inventors: Yair Alon, Mountain View, CA (US); Elad Eban, Mountain View, CA (US); Xiaofeng Wang, Mountain View, CA (US)

(73) Assignee: Google LLC, Mountain View, CA (US)

( * ) Notice: Subject to any disclaimer, the term of this patent is extended or adjusted under 35 U.S.C. 154(b) by 540 days.

(21) Appl. No.: 17/526,886

(22) Filed: Nov. 15, 2021

(65) Prior Publication Data

US 2022/0156524 A1    May 19, 2022

Related U.S. Application Data

(60) Provisional application No. 63/114,205, filed on Nov. 16, 2020.

(51) Int. Cl.
*G06V 10/20*    (2022.01)
*G06N 3/045*    (2023.01)
(Continued)

(52) U.S. Cl.
CPC .......... *G06V 10/255* (2022.01); *G06N 3/045* (2023.01); *G06N 20/20* (2019.01); *G06V 10/82* (2022.01)

(58) Field of Classification Search
CPC  G06T 2207/20081; G06T 2207/20084; G06V 10/82; G06V 10/255;
(Continued)

(56) References Cited

U.S. PATENT DOCUMENTS

| | | | |
|---|---|---|---|
| 2016/0148079 A1* | 5/2016 | Shen | G06V 10/454 |
| | | | 382/157 |
| 2021/0073686 A1* | 3/2021 | Ding | G06N 20/20 |

(Continued)

OTHER PUBLICATIONS

Inoue, Hiroshi. "Adaptive ensemble prediction for deep neural networks based on confidence level." The 22nd International Conference on Artificial Intelligence and Statistics. PMLR, 2019. (Year: 2019).*

(Continued)

*Primary Examiner* — Geoffrey E Summers
(74) *Attorney, Agent, or Firm* — McDonnell Boehnen Hulbert & Berghoff LLP (57) ABSTRACT

A combination of two or more trained machine learning models can exhibit a combined accuracy greater than the accuracy of any one of the constituent models. However, this increase accuracy comes at additional computational cost. Cascades of machine learning models are provided herein that result in increased model accuracy and/or reduced model compute cost. These benefits are obtained by conditionally executing one or more of the models of the cascade based on the estimated correctness of already-executed models. The estimated correctness can be obtained as an additional output of the already-executed model(s) or could be determined as an entropy, maximum class probability, maximum class logit, or other function of the output(s) of the already-executed model(s). The expected computational cost of executing the model cascade is reduced by only executing the downstream model(s) when the upstream model(s) has resulted in an output whose accuracy is suspect.

19 Claims, 8 Drawing Sheets

(51) Int. Cl.
  *G06N 20/20* (2019.01)
  *G06V 10/82* (2022.01)
(58) Field of Classification Search
  CPC .. G06V 10/7796; G06V 10/809; G06N 3/045; G06N 3/0455; G06N 20/20; G06F 18/254
  See application file for complete search history.

(56) References Cited

U.S. PATENT DOCUMENTS

| | | | | |
|---|---|---|---|---|
| 2021/0216831 A1* | 7/2021 | Ben-Itzhak | ......... | G06F 18/2155 |
| 2023/0112076 A1* | 4/2023 | Enomoto | .............. | G06F 18/285 706/12 |

OTHER PUBLICATIONS

Li, Xiaoxiao, et al. "Not All Pixels Are Equal: Difficulty-Aware Semantic Segmentation via Deep Layer Cascade." 2017 IEEE Conference on Computer Vision and Pattern Recognition (CVPR). IEEE, 2017. (Year: 2017).*
Wang, Xin, et al. "Idk cascades: Fast deep learning by learning not to overthink." arXiv preprint arXiv:1706.00885v4 (2018). (Year: 2018).*
Teplyakov, L. M., et al. "Training of neural network-based cascade classifiers." Journal of Communications Technology and Electronics 64 (2019): 846-853. (Year: 2019).*
Nguyen, Tien Thanh, et al. "Ensemble selection based on classifier prediction confidence." Pattern Recognition 100 (2020): 107104. (Year: 2019).*
Mohandes, Mohamed, Mohamed Deriche, and Salihu O. Aliyu. "Classifiers combination techniques: A comprehensive review." IEEE Access 6 (2018): 19626-19639. (Year: 2018).*
Leo Breiman, "Bagging predictors", Machine learning, 24(2): 123-140, 1996.
Cao et al., "Learnable embedding space for efficient neural architecture compression", 2019.
Carreira et al., "A short note about kinetics-600", 2018.
Chaudhuri et al., "Fine-grained stochastic architecture search", 2020.
Chen et al., "Rethinking atrous convolution for semantic image segmentation", 2017.
Cordts et al., "The cityscapes dataset for semantic urban scene understanding", 2016.
Cubuk et al., "Autoaugment: Learning augmentation policies from data", 2019.
Christoph Feichtenhofer, "X3d: Expanding architectures for efficient video recognition", 2020.
Fort et al., "Deep ensembles: A loss landscape perspective", 2019.
Freund et al., "A decision-theoretic generalization of on-line learning and an application to boosting", Journal of computer and system sciences, 55(1):119-139, 1997.
Guan et al., "Energy-efficient amortized inference with cascaded deep classifiers", 2018.
He et al., "Deep residual learning for image recognition", 2016.
Howard et al., "Mobilenets: Efficient convolutional neural networks for mobile vision applications", 2017.
Hu et al., "Squeeze-and-excitation networks", 2018.
Huang et al., "Multi-scale dense networks for resource efficient image classification", 2018.
Huang et al., "Snapshot ensembles: Train 1, get M for free", 2017.
Huang et al., "Densely connected convolutional networks", 2017.
Kondratyuk et al., "When ensembling smaller models is more efficient than single large models", 2020.
Lakshminarayanan et al., "Simple and scalable predictive uncertainty estimation using deep ensembles", 2017.
Liu et al., "Progressive neural architecture search", 2018.
Liu et al., "DARTS: Differentiable architecture search", 2019.
Lobacheva et al. "On power laws in deep ensembles", 2020.
Qiu et al., "Trimmed action recognition, dense-captioning events in videos, and spatio-temporal action localization with focus on activitynet challenge", 2019.
Real et al., "Regularized evolution for image classifier architecture search", 2019.
Russakovsky et al., "Imagenet large scale visual recognition challenge", 2015.
Sandler et al., "Mobilenetv2: Inverted residuals and linear bottlenecks", 2018.
Schapire et al., "The strength of weak learnability", Machine learning, 5(2):197-227, 1990.
Shazeer et al., "Outrageously large neural networks: The sparsely-grated mixture-of-experts layer", 2017.
Streeter et al., "Approximation algorithms for cascading prediction models", 2018.
Szegedy et al., "Inception-v4, inception-resnet and the impact of residual connections on learning", 2017.
Szegedy et al., "Going deeper with convolutions", 2015.
Szegedy et al., "Rethinking the inception architecture for computer vision", 2016.
Tan et al., "MnasNet: Platform-aware neural architecture search for mobile", 2019.
Tan et al., "Efficientnet: Rethinking model scaling for convolutional neural networks", 2019.
Touvron et al., "Fixing the train-test resolution discrepancy", 2019.
Veit et al., "Convolutional networks with adaptive inference graphs", 2018.
Viola et al., "Rapid object detection using a boosted cascade of simple features", 2001.
Wang et al., "Skipnet: Learning dynamic routing in convolutional networks", 2018.
Wen et al., "Batchensemble: an alternative approach to efficient ensemble and lifelong learning", 2020.
Wenzel et al., "Hyperparameter ensembles for robustness and uncertainty quantification", 2020.
Wu et al., "Blockdrop: Dynamic inference paths in residual networks", 2018.
Xie et al., "Aggregated residual transformations for deep neural networks", 2017.
Zhang et al., "Shufflenet: An extremely efficient convolutional neural network for mobile devices", 2018.
Zoph et al., "Learning transferable architectures for scalable image recognition", 2018.
Howard et al., "Searching for mobilenetv3", 2019.
Bolukbasi et al., "Adaptive neural networks for efficient inference", 2017.

* cited by examiner

EFFICIENT NEURAL NETWORKS VIA ENSEMBLES AND CASCADES

CROSS-REFERENCE TO RELATED APPLICATION

The present application is a non-provisional patent application claiming priority to U.S. Provisional Patent Application No. 63/114,205, filed on Nov. 16, 2020, the contents of which are hereby incorporated by reference.

BACKGROUND

Artificial neural networks, convolutional neural networks, regression trees/forests, decision trees/forests, support vector machines, or other machine learning models can be used to classify inputs, to filter or otherwise modify inputs, or to provide other beneficial outputs from applied inputs. The accuracy of a given machine learning model structure can often be increased by training additional machine learning model(s) and combining their outputs to generate a single output. The accuracy of the combined output can be greater than the accuracy of any individual one of the constituent models.

The machine learning models of such a combination of machine learning models could differ in a variety of ways in order to provide improved accuracy when used in combination. The models could differ with respect to model structure, training data set, validation data set, initial conditions/seed parameters, training set size, training method, or some other property or parameter.

SUMMARY

In a first aspect, a method is provided that includes: (i) applying a first machine learning model to an input to generate a first model output; (ii) determining, based on the first model output, a correctness metric for the first model output; (iii) determining that the correctness metric exceeds a threshold, wherein the threshold has a value that has been determined for the first machine learning model and a second machine learning model based on a set of training inputs; and (iv) responsive to determining that the correctness metric exceeds the threshold: (a) applying the second machine learning model to the input to generate a second model output; and (b) combining the first model output and the second model output to generate a combined output.

In another aspect an article of manufacture is provided that includes a non-transitory computer-readable medium, having stored therein instructions executable by a computing device to cause the computing device to perform the above method.

In another aspect a system is provided that includes: (i) one or more processors; and (ii) a non-transitory computer-readable medium, having stored therein instructions executable by the one or more processors to cause the system to perform the above method.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

I. OVERVIEW

A variety of machine learning model types and associated training methods have been developed in order to generate outputs from inputs in a variety of applications. Such models have been developed to be able to accurately predict class values, segmentation maps, or other outputs from images, feature vectors, or other inputs.

The accuracy of such models is related to a variety of factors, including the amount and type of training data used to train the models, the methods used to perform that training, the structure of the models, and the size and/or number of parameters of the models, among other factors. A common method to increase the accuracy of a particular model or model type is to train multiple machine learning models and to combine their outputs into a single combined output. Such an arrangement is sometimes referred to as an ensemble of machine learning models.

The accuracy of the combined output can be improved relative to the accuracy of any one of the constituent models since inputs which are 'difficult' for one model are unlikely to be 'difficult' for all of the constituent models. The different models can differ with respect to model structure, the set of training and/or validation data used to train the models, the ordering of training data used to train the models, the method used to train the models, the initial weights or conditions of the models prior to training, or some other factor(s).

Figure 1A:
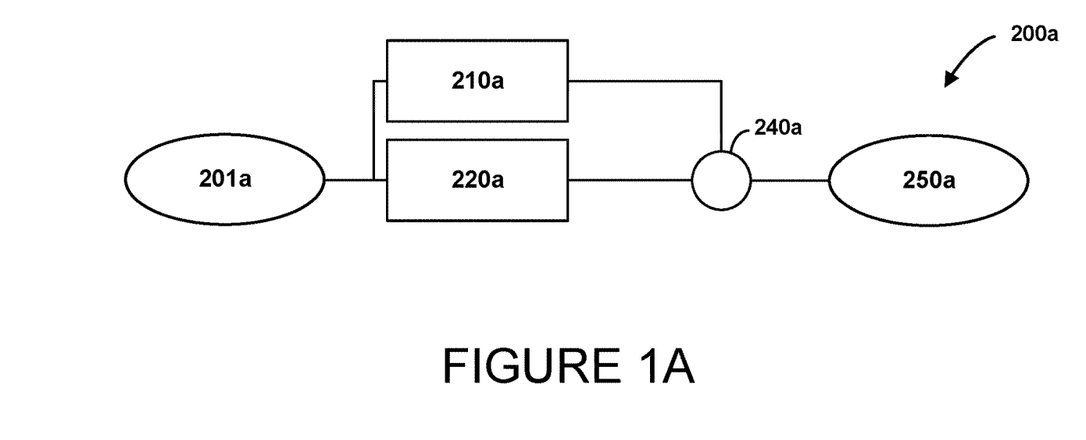
FIG. 1A illustrates an example method.

FIG. 1A depicts an example of such an ensemble 200a. An input 201a (e.g., an image, a feature vector, etc.) is provided to two different machine learning models 210a, 220a. Based on the provided input 201a, the models 210a, 220a generate respective outputs that are combined 240a to generate a combined output 250a. Such an output could be an estimate of a class of the input (e.g., a class selected from an enumerated set of possible classes), a set of values indicative of the likelihood that the input is a member of each class in an enumerated set of classes (e.g., a vector of probabilities, a vector of logits), a filtered or otherwise modified version of the input (e.g., a filtered image), an estimate of a discretely- or continuously-valued output (e.g., an estimate of a number of persons depicted in an image, and estimate of an amount of a microorganism present in an sample based on measurements of a variety of metabolites in the sample), or some other output.

Combination of the output (at block 240a) can take a variety of forms, depending on the form of the individual model outputs. Combination could include taking an average of the outputs. For example, each output could include a set of probabilities, likelihoods, logits, or other values indicative of the likelihood that the input is a member of each class in an enumerated set of classes. Combining such outputs could include summing the values together, taking the mean of the outputs, taking a weighted average of the outputs, or performing some other function on the outputs in an elementwise fashion or in some other manner. For example, the outputs could be combined as a weighted average, with the weights related to the relative accuracies of the individual models. In another example, the outputs could be indications of estimated class membership of the input, and combining the outputs could include counting the number of models that predicted each class and selecting the most-predicted class. In another example, the outputs could include discretely- or continuously-valued variables (e.g., brightness values of pixels of an outputs image) and combining the outputs could include determining a mean, a mode, or some other average of the outputs. Such a combination could be weighted according to the relative accuracies of the individual models.

However, the accuracy increase from adding one (or more) machine learning models to an ensemble comes with increase computational cost to execute the whole ensemble. Indeed, for many inputs, the accuracy increase provided by the additional model(s) is minimal compared to the additional computational cost. Embodiments described herein provide for increased model accuracy and/or reduced computational cost by conditionally executing the additional machine learning models only when the benefits of such computation are likely to provide sufficiently increased output accuracy. Such sets of machine learning models, wherein one or more of the models are conditionally executed, are referred to herein as "cascades" of machine learning models.

Figure 1B:
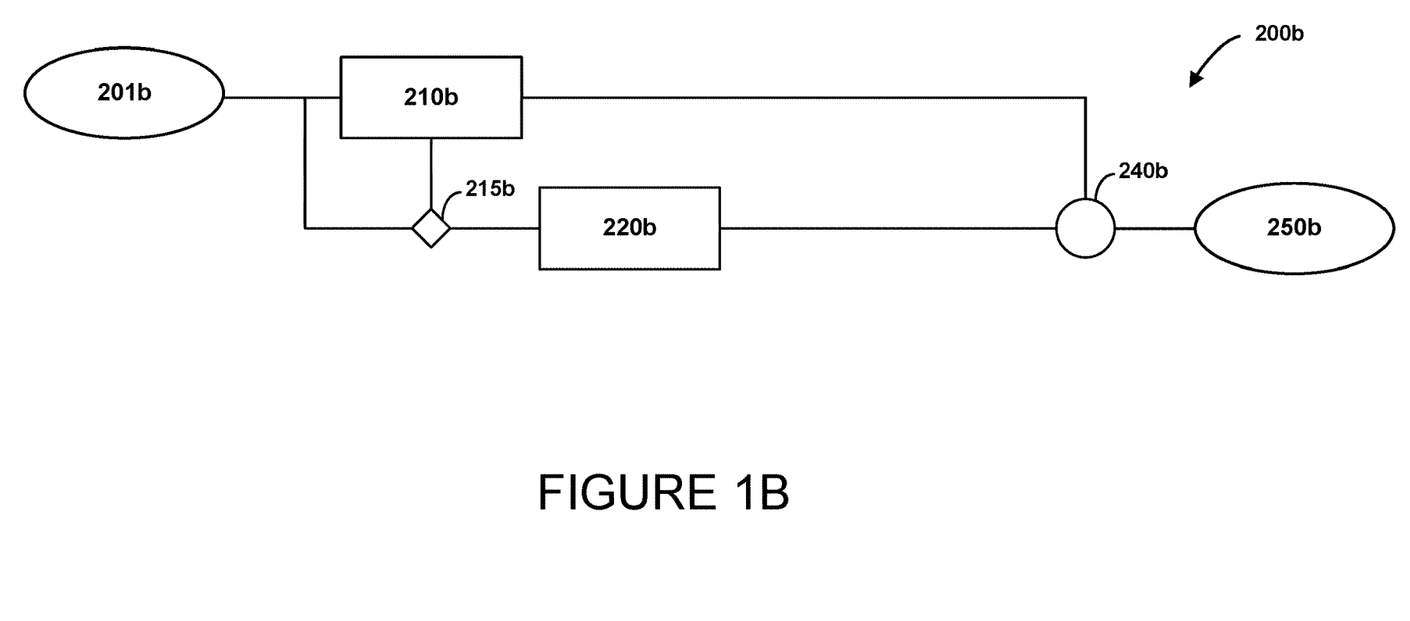
FIG. 1B illustrates an example method.

FIG. 1B depicts an example of such a cascade 200b. An input 201b (e.g., an image, a feature vector, etc.) is provided to a first machine learning models 210b. Based on the provided input 201b, the model 210b generates a first output. The model 210b may also generate a first correctness metric that is related to the likelihood that the first model output is correct, a degree of confidence in the first model output, or some other factor(s) related to the likelihood that execution of additional machine learning model(s) on the input will render an increase in the combined output accuracy sufficient to justify the computational cost of executing the additional machine learning model(s).

Additionally or alternatively, such a first correctness metric could be determined based on the output of the first model. For example, the first correctness metric could be determined based on a probability of a highest-confidence class represented by the first model output, an entropy of a probability distribution represented by the first model output, a magnitude of a difference between a highest probability represented by the first model output and a second-highest probability represented by the first model output, a magnitude of a difference between a logit of a highest probability represented by the first model output and a logit of a second-highest probability represented by the first model output, a conditional entropy bottleneck value of the first model output, a cross entropy of the first model output, or some combination of the above factors and/or additional factor(s).

The first correctness metric is then compared to a first threshold 215b. If the first correctness metric exceeds the first threshold 215b (e.g., is less than the threshold, is greater than the threshold), a second machine learning model 220b is applied to the input 201b to generate a second output. The first output and the second output are then combined 240b to generate a combined output 250b of the cascade. If the first correctness metric does not exceed the first threshold, then the second machine learning model 220b is not executed and the first model output is used as the combined cascade output 250b.

Note that a cascade could include additional conditionally-executed models and/or unconditionally executed models. For example, each of the models 210b, 220b depicted in FIG. 1B could represent multiple different machine learning models whose outputs are combined. Additionally or alternatively, a second correctness metric could be generated by second machine learning model 220b and/or determined from its output and the second correctness metric could be used to determine whether to conditionally execute further machine learning models (e.g., a third machine learning model). This could include comparing the second correctness metric to a second threshold, which may be the same or different from the first threshold 215b. Alternatively, the first and second correctness metrics could be used together to determine whether to execute additional machine learning models (e.g., based on the output of a lookup table, based on comparison to a two-dimensional threshold curve or surface). The cascade 200b could be extended in this manner for additional levels of conditional execution of machine learning models.

The models of a machine learning cascade as described herein could differ in a variety of ways. For example, the models of a cascade can differ with respect to model structure, the set of training and/or validation data used to train the models, the ordering of training data used to train the models, the method used to train the models, the initial weights or conditions of the models prior to training, or some other factor(s). In some examples, the two (or more) machine learning models of a cascade could have different model structured (e.g., the first model could be a B5 EfficientNet model and the second model could be a B6 EfficientNet model). In some examples, executing the first model and executing the second model could include executing the same convolutional neural network using respective different first and second input sizes.

The threshold(s) of a machine learning model cascade as described herein could be specified so as to increase the expected accuracy and/or decrease the expected computational cost of executing the cascade with respect to a specified set of training inputs (which may include training data used to train the models, to validate the models, or training data that was not used to train the model at all but instead used only to set the threshold value, or some other training data). Generally, the structural parameters of a single machine learning model are optimized to maximize accuracy with respect to the training inputs of interest while remaining within a specified maximum computational cost; this problem can be represented as:

$$\max_{\alpha \in A} \text{Accuracy}(\alpha) \text{ s.t. } \text{FLOPS}(\alpha) \leq FLOPS_{target}$$

where α represents the structural configuration of the model, A represents the search space of valid structural configurations, FLOPS is a function returning the expected computational cost of executing a model of configuration α, and $FLOPS_{target}$ is the target computational cost.

A cascade of machine learning models can be optimized in a similar manner, to increase the expected accuracy of the cascade output with respect to the specified set of training inputs while maintaining the expected computational cost of execution of the cascade below a specified maximum computational cost, represented as:

$$\max_{\alpha_1, \alpha_2 \in A, t} \text{Accuracy}(f(\alpha_1, \alpha_2, t)) \text{ s.t. } \text{FLOPS}(f(\alpha_1, \alpha_2, t)) \leq FLOPS_{target}$$

where $\alpha_1$ and $\alpha_2$ represent the structural configurations of the models respectively, t represents the threshold level of the correctness metric of the output of the first model in order to execute the second model. Other optimizations could be applied, e.g., to reduce the expected computational cost of execution of the cascade while maintaining the expected accuracy with respect to the specified set of training inputs above a specified minimum level, represented as:

$$\min_{\alpha_1, \alpha_2 \in A, t} \text{FLOPS}(f(\alpha_1, \alpha_2, t)) \text{ s.t. } \text{Accuracy}(f(\alpha_1, \alpha_2, t)) \geq Accuracy_{target}$$

where $Accuracy_{target}$ is the target accuracy. Other cost functions could be applied to satisfy other considerations.

In some examples, pre-existing models could be combined into a cascade as described herein. The threshold(s) of such a cascade could then be set to increase the accuracy and/or reduce the computational cost of the cascade with respect to some dataset of interest.

In some examples, the conditionally-executed model(s) could be specifically trained and/or selected based on training examples on which preceding models in the cascade perform poorly. For example, a first, unconditionally-executed machine learning model could be trained based on all of the examples in a training dataset. A second, conditionally-executed model could then be trained only on those examples in the training dataset for which the first model performed poorly (e.g., misclassified the examples, resulted in a sub-threshold correctness metric, etc.).

II. EXAMPLE MACHINE LEARNING MODELS AND TRAINING THEREOF

A machine learning model as described herein may include, but is not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system), a support vector machine, a regression tree, an ensemble of regression trees (also referred to as a regression forest), a decision tree, an ensemble of decision trees (also referred to as a decision forest), or some other machine learning model architecture or combination of architectures.

An artificial neural network (ANN) could be configured in a variety of ways. For example, the ANN could include two or more layers, could include units having linear, logarithmic, or otherwise-specified output functions, could include fully or otherwise-connected neurons, could include recurrent and/or feed-forward connections between neurons in different layers, could include filters or other elements to process input information and/or information passing between layers, or could be configured in some other way to facilitate the generation of predicted color palettes based on input images.

An ANN could include one or more filters that could be applied to the input and the outputs of such filters could then be applied to the inputs of one or more neurons of the ANN. For example, such an ANN could be or could include a convolutional neural network (CNN). Convolutional neural networks are a variety of ANNs that are configured to facilitate ANN-based classification or other processing based on images or other large-dimensional inputs whose elements are organized within two or more dimensions. The organization of the ANN along these dimensions may be related to some structure in the input structure (e.g., as relative location within the two-dimensional space of an image can be related to similarity between pixels of the image).

In example embodiments, a CNN includes at least one two-dimensional (or higher-dimensional) filter that is applied to an input; the filtered input is then applied to neurons of the CNN (e.g., of a convolutional layer of the CNN). The convolution of such a filter and an input could represent the color values of a pixel or a group of pixels from the input, in embodiments where the input is an image. A set of neurons of a CNN could receive respective inputs that are determined by applying the same filter to an input. Additionally or alternatively, a set of neurons of a CNN could be associated with respective different filters and could receive respective inputs that are determined by applying the respective filter to the input. Such filters could be trained during training of the CNN or could be pre-specified. For example, such filters could represent wavelet filters, center-surround filters, biologically-inspired filter kernels (e.g., from studies of animal visual processing receptive fields), or some other pre-specified filter patterns.

A CNN or other variety of ANN could include multiple convolutional layers (e.g., corresponding to respective different filters and/or features), pooling layers, rectification layers, fully connected layers, or other types of layers. Convolutional layers of a CNN represent convolution of an input image, or of some other input (e.g., of a filtered, downsampled, or otherwise-processed version of an input image), with a filter. Pooling layers of a CNN apply nonlinear downsampling to higher layers of the CNN, e.g., by applying a maximum, average, L2-norm, or other pooling function to a subset of neurons, outputs, or other features of the higher layer(s) of the CNN. Rectification layers of a CNN apply a rectifying nonlinear function (e.g., a non-saturating activation function, a sigmoid function) to outputs of a higher layer. Fully connected layers of a CNN receive inputs from many or all of the neurons in one or more higher layers of the CNN. The outputs of neurons of one or more fully connected layers (e.g., a final layer of an ANN or CNN) could be used to determine information about areas of an input image (e.g., for each of the pixels of an input image) or for the image as a whole.

Neurons in a CNN can be organized according to corresponding dimensions of the input. For example, where the input is an image (a two-dimensional input, or a threedimensional input where the color channels of the image are arranged along a third dimension), neurons of the CNN (e.g., of an input layer of the CNN, of a pooling layer of the CNN) could correspond to locations in the two-dimensional input image. Connections between neurons and/or filters in different layers of the CNN could be related to such locations. For example, a neuron in a convolutional layer of the CNN could receive an input that is based on a convolution of a filter with a portion of the input image, or with a portion of some other layer of the CNN, that is at a location proximate to the location of the convolutional-layer neuron. In another example, a neuron in a pooling layer of the CNN could receive inputs from neurons, in a layer higher than the pooling layer (e.g., in a convolutional layer, in a higher pooling layer), that have locations that are proximate to the location of the pooling-layer neuron.

Figure 2:
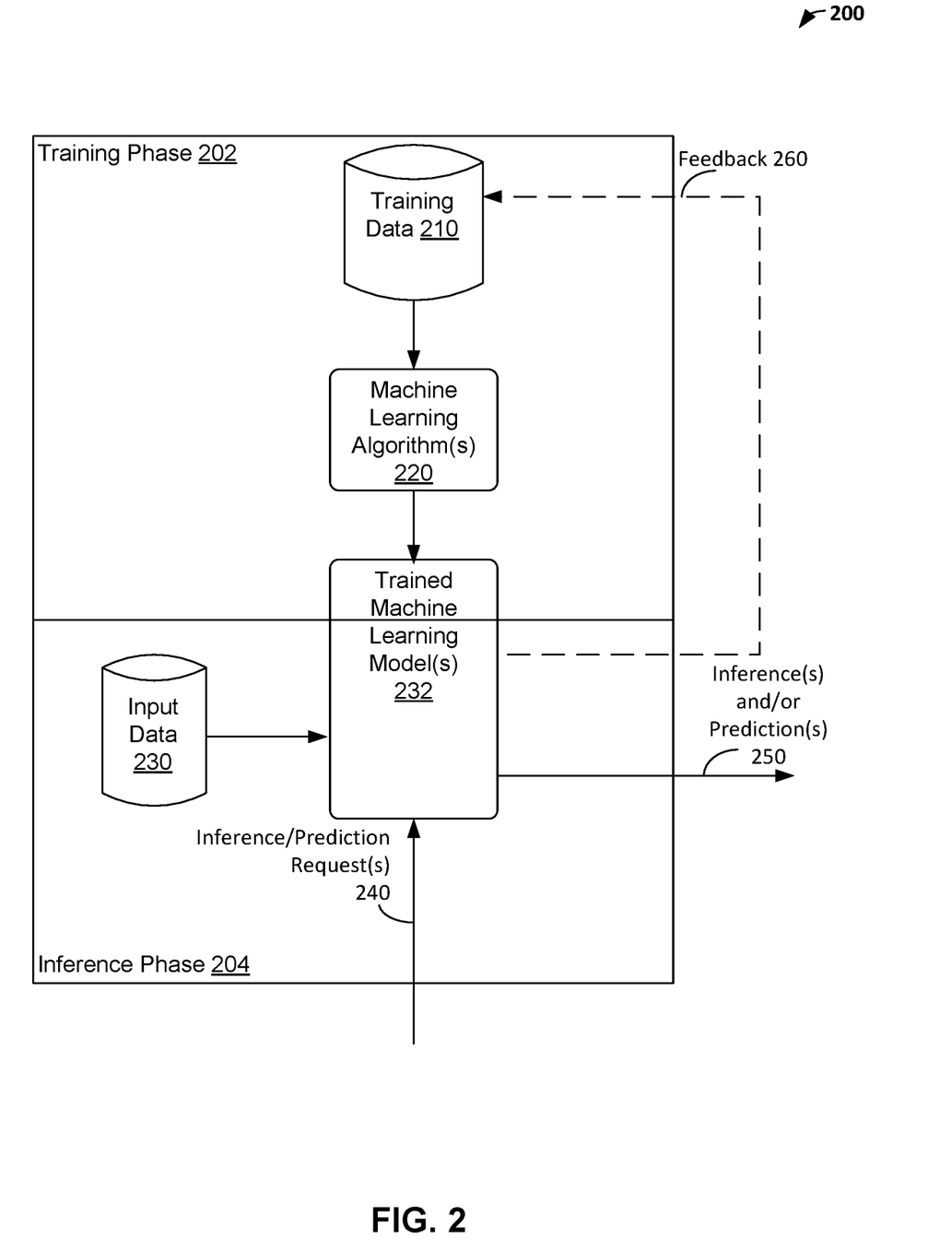
FIG. 2 is a diagram illustrating training and inference phases of a machine learning model, in accordance with example embodiments.

FIG. 2 shows diagram 200 illustrating a training phase 202 and an inference phase 204 of trained machine learning model(s) 232, in accordance with example embodiments. Some machine learning techniques involve training one or more machine learning algorithms, on an input set of training data to recognize patterns in the training data and provide output inferences and/or predictions about (patterns in the) training data. Such output could take the form of filtered or otherwise modified versions of the input, e.g., an input image could be modified by the machine learning model to appear as though foreground content is in-focus while background content is out of focus. The resulting trained machine learning algorithm can be termed as a trained machine learning model. For example, FIG. 2 shows training phase 202 where one or more machine learning algorithms 220 are being trained on training data 210 to become trained machine learning model 232. Then, during inference phase 204, trained machine learning model 232 can receive input data 230 and one or more inference/prediction requests 240 (perhaps as part of input data 230) and responsively provide as an output one or more inferences and/or predictions 250.

As such, trained machine learning model(s) 232 can include one or more models of one or more machine learning algorithms 220. Machine learning algorithm(s) 220 may include, but are not limited to: an artificial neural network (e.g., a herein-described convolutional neural networks, a recurrent neural network, a Bayesian network, a hidden Markov model, a Markov decision process, a logistic regression function, a support vector machine, a suitable statistical machine learning algorithm, and/or a heuristic machine learning system), a support vector machine, a regression tree, an ensemble of regression trees (also referred to as a regression forest), a decision tree, an ensemble of decision trees (also referred to as a decision forest), or some other machine learning model architecture or combination of architectures. Machine learning algorithm(s) 220 may be supervised or unsupervised, and may implement any suitable combination of online and offline learning.

In some examples, machine learning algorithm(s) 220 and/or trained machine learning model(s) 232 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 220 and/or trained machine learning model(s) 232. In some examples, trained machine learning model(s) 232 can be trained, reside and execute to provide inferences on a particular computing device, and/or otherwise can make inferences for the particular computing device.

During training phase 202, machine learning algorithm(s) 220 can be trained by providing at least training data 210 as training input using unsupervised, supervised, semi-supervised, and/or reinforcement learning techniques. Unsupervised learning involves providing a portion (or all) of training data 210 to machine learning algorithm(s) 220 and machine learning algorithm(s) 220 determining one or more output inferences based on the provided portion (or all) of training data 210. Supervised learning involves providing a portion of training data 210 to machine learning algorithm(s) 220, with machine learning algorithm(s) 220 determining one or more output inferences based on the provided portion of training data 210, and the output inference(s) are either accepted or corrected based on correct results associated with training data 210. In some examples, supervised learning of machine learning algorithm(s) 220 can be governed by a set of rules and/or a set of labels for the training input, and the set of rules and/or set of labels may be used to correct inferences of machine learning algorithm(s) 220.

Semi-supervised learning involves having correct results for part, but not all, of training data 210. During semi-supervised learning, supervised learning is used for a portion of training data 210 having correct results, and unsupervised learning is used for a portion of training data 210 not having correct results. Reinforcement learning involves machine learning algorithm(s) 220 receiving a reward signal regarding a prior inference, where the reward signal can be a numerical value. During reinforcement learning, machine learning algorithm(s) 220 can output an inference and receive a reward signal in response, where machine learning algorithm(s) 220 are configured to try to maximize the numerical value of the reward signal. In some examples, reinforcement learning also utilizes a value function that provides a numerical value representing an expected total of the numerical values provided by the reward signal over time. In some examples, machine learning algorithm(s) 220 and/or trained machine learning model(s) 232 can be trained using other machine learning techniques, including but not limited to, incremental learning and curriculum learning.

In some examples, machine learning algorithm(s) 220 and/or trained machine learning model(s) 232 can use transfer learning techniques. For example, transfer learning techniques can involve trained machine learning model(s) 232 being pre-trained on one set of data and additionally trained using training data 210. More particularly, machine learning algorithm(s) 220 can be pre-trained on data from one or more computing devices and a resulting trained machine learning model provided to computing device CD1, where CD1 is intended to execute the trained machine learning model during inference phase 204. Then, during training phase 202, the pre-trained machine learning model can be additionally trained using training data 210, where training data 210 can be derived from kernel and non-kernel data of computing device CD1. This further training of the machine learning algorithm(s) 220 and/or the pre-trained machine learning model using training data 210 of CD1's data can be performed using either supervised or unsupervised learning. Once machine learning algorithm(s) 220 and/or the pre-trained machine learning model has been trained on at least training data 210, training phase 202 can be completed. The trained resulting machine learning model can be utilized as at least one of trained machine learning model(s) 232.

In particular, once training phase 202 has been completed, trained machine learning model(s) 232 can be provided to a computing device, if not already on the computing device. Inference phase 204 can begin after trained machine learning model(s) 232 are provided to computing device CD1.

During inference phase 204, trained machine learning model(s) 232 can receive input data 230 and generate and output one or more corresponding inferences and/or predictions 250 about input data 230. As such, input data 230 can be used as an input to trained machine learning model(s) 232 for providing corresponding inference(s) and/or prediction(s) 250 to kernel components and non-kernel components. For example, trained machine learning model(s) 232 can generate inference(s) and/or prediction(s) 250 in response to one or more inference/prediction requests 240. In some examples, trained machine learning model(s) 232 can be executed by a portion of other software. For example, trained machine learning model(s) 232 can be executed by an inference or prediction daemon to be readily available to provide inferences and/or predictions upon request. Input data 230 can include data from computing device CD1 executing trained machine learning model(s) 232 and/or input data from one or more computing devices other than CD1.

Input data 230 can include a collection of images provided by one or more sources. The collection of images can include video frames, images resident on computing device CD1, and/or other images. Other types of input data are possible as well.

Inference(s) and/or prediction(s) 250 can include output images, output intermediate images, numerical values, and/or other output data produced by trained machine learning model(s) 232 operating on input data 230 (and training data 210). In some examples, trained machine learning model(s) 232 can use output inference(s) and/or prediction(s) 250 as input feedback 260. Trained machine learning model(s) 232 can also rely on past inferences as inputs for generating new inferences.

A conditioned, axial self-attention based neural network can be an example of machine learning algorithm(s) 220. After training, the trained version of the neural network can be an example of trained machine learning model(s) 232. In this approach, an example of inference/prediction request(s) 240 can be a request to predict one or more colorizations of a grayscale image and a corresponding example of inferences and/or prediction(s) 250 can be an output image including the one or more colorizations of the grayscale image.

III. ILLUSTRATIVE SYSTEMS

Figure 3:
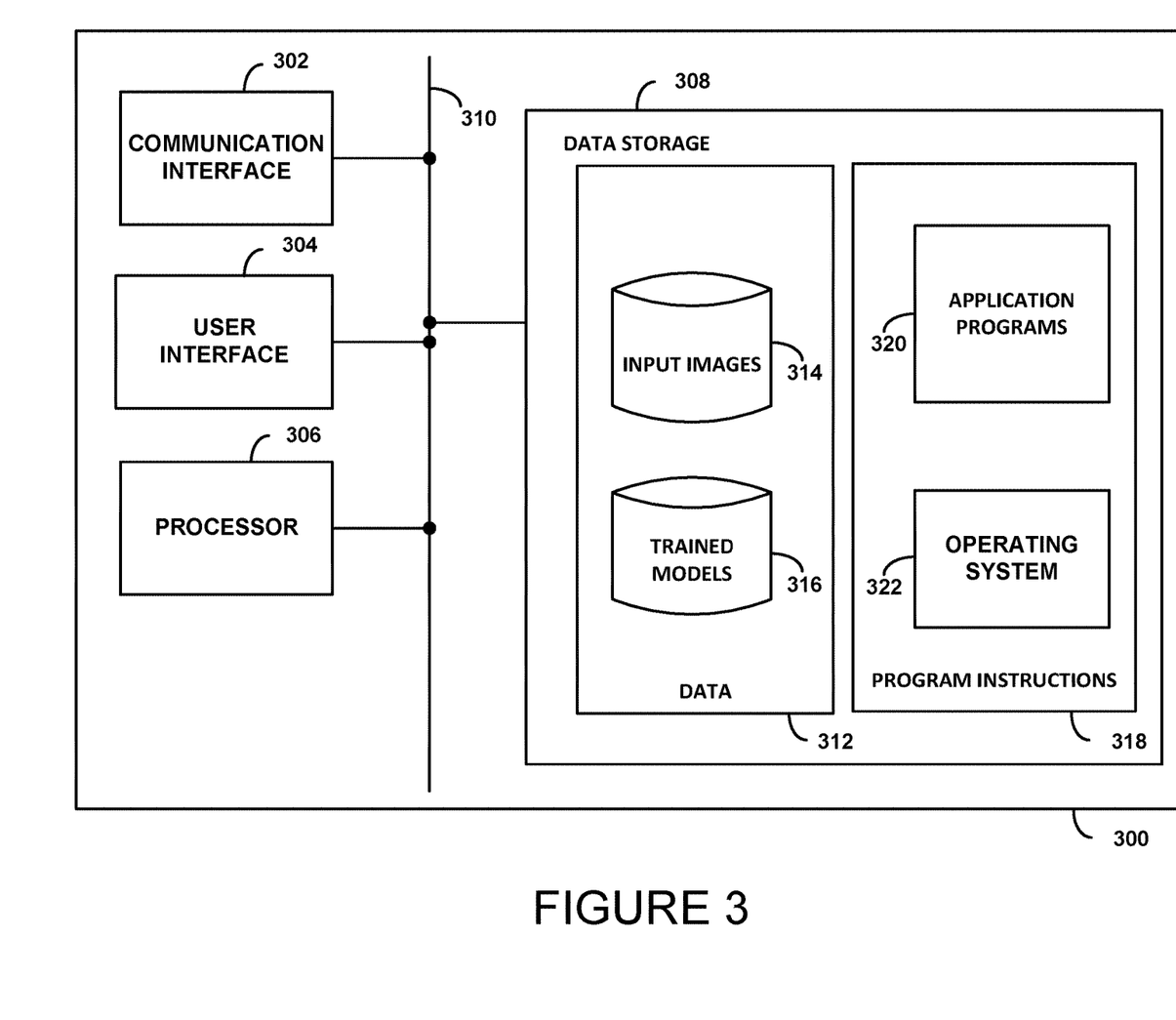
FIG. 3 is a simplified block diagram showing some of the components of an example computing system.

FIG. 3 illustrates an example computing device 300 that may be used to implement the methods described herein. By way of example and without limitation, computing device 300 may be a cellular mobile telephone (e.g., a smartphone), a computer (such as a desktop, notebook, tablet, or handheld computer, a server), elements of a cloud computing system, a robot, a drone, an autonomous vehicle, or some other type of device. It should be understood that computing device 300 may represent a physical computing device such as a server, a particular physical hardware platform on which a machine learning application operates in software, or other combinations of hardware and software that are configured to carry out machine learning functions as described herein.

As shown in FIG. 3, computing device 300 may include a communication interface 302, a user interface 304, a processor 306, and data storage 308, all of which may be communicatively linked together by a system bus, network, or other connection mechanism 310.

Communication interface 302 may function to allow computing device 300 to communicate, using analog or digital modulation of electric, magnetic, electromagnetic, optical, or other signals, with other devices, access networks, and/or transport networks. Thus, communication interface 302 may facilitate circuit-switched and/or packet-switched communication, such as plain old telephone service (POTS) communication and/or Internet protocol (IP) or other packetized communication. For instance, communication interface 302 may include a chipset and antenna arranged for wireless communication with a radio access network or an access point. Also, communication interface 302 may take the form of or include a wireline interface, such as an Ethernet, Universal Serial Bus (USB), or High-Definition Multimedia Interface (HDMI) port. Communication interface 302 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

In some embodiments, communication interface 302 may function to allow computing device 300 to communicate, with other devices, remote servers, access networks, and/or transport networks. For example, the communication interface 302 may function to access one or more machine learning models and/or input therefor via communication with a remote server or other remote device or system in order to allow the computing device 300 to use the machine learning model to generate outputs (e.g., class values for inputs, filtered or otherwise modified versions of image inputs) based on input data. For example, the computing system 300 could be an image server and the remote system could be a smartphone containing an image to be applied to a machine learning model.

User interface 304 may function to allow computing device 300 to interact with a user, for example to receive input from and/or to provide output to the user. Thus, user interface 304 may include input components such as a keypad, keyboard, touch-sensitive or presence-sensitive panel, computer mouse, trackball, joystick, microphone, and so on. User interface 304 may also include one or more output components such as a display screen which, for example, may be combined with a presence-sensitive panel. The display screen may be based on CRT, LCD, and/or LED technologies, or other technologies now known or later developed. User interface 304 may also be configured to generate audible output(s), via a speaker, speaker jack, audio output port, audio output device, earphones, and/or other similar devices.

Processor 306 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing, image alignment, merging images, executing artificial neural networks, or executing convolutional neural networks, among other applications or functions. Data storage 308 may include one or more volatile and/or non-volatile storage components, such as magnetic, optical, flash, or organic storage, and may be integrated in whole or in part with processor 306. Data storage 308 may include removable and/or non-removable components.

Processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, upon execution by computing device 300, cause computing device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., functions for executing trained machine learning models) installed on computing device 300. Data 312 may include input images 314 and/or one or more trained machine learning models 316. Input images 314 may be used to train machine learning model and/or may be applied to such a trained model in order to generate a class for the input image or to generate some other model output as described herein.

Application programs 320 may communicate with operating system 322 through one or more application programming interfaces (APIs). These APIs may facilitate, for instance, application programs 320 reading and/or writing a trained machine learning model 316, transmitting or receiving information via communication interface 302, receiving and/or displaying information on user interface 304, and so on.

Application programs 320 may take the form of "apps" that could be downloadable to computing device 300 through one or more online application stores or application markets (via, e.g., the communication interface 302). However, application programs can also be installed on computing device 300 in other ways, such as via a web browser or through a physical interface (e.g., a USB port) of the computing device 300.

IV. EXAMPLE METHODS

Figure 4:
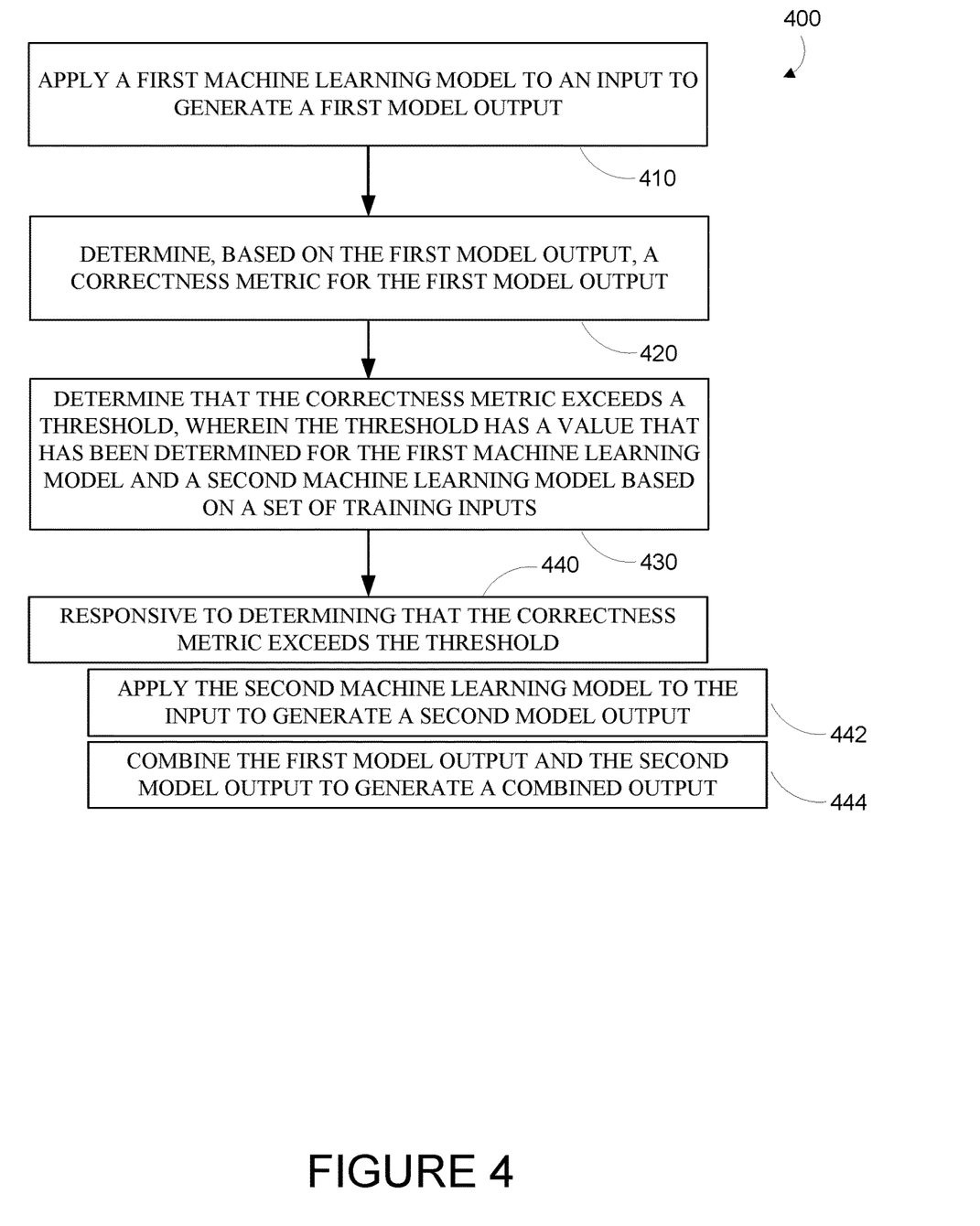
FIG. 4 is a flowchart of a method.

FIG. 4 is a flowchart of a method 400 for conditionally applying an input to two or more machine learning models so as to reduce the expected cost of executing the models and/or to increase the expected accuracy of the combined model output. The method 400 includes applying a first machine learning model to an input to generate a first model output (410). The method 400 additionally includes determining, based on the first model output, a correctness metric for the first model output (420). The method 400 additionally includes determining that the correctness metric exceeds a threshold (430). The threshold has a value that has been determined for the first machine learning model and a second machine learning model based on a set of training inputs. The method 400 additionally includes performing additional steps responsive to determining that the correctness metric exceeds the threshold (440). These responsive steps include applying the second machine learning model to the input to generate a second model output (442). The responsive steps additionally include combining the first model output and the second model output to generate a combined output (444).

These embodiments could include additional elements or features. In some embodiments, the input is an input image. In some embodiments, the first machine learning model includes a convolutional neural network. In such embodiments, the first model output includes a version of the input image modified by the first machine learning model.

In some embodiments, the first model output is indicative of membership of the input in one or more classes from an enumerated set of classes.

In some embodiments, the first model output includes the correctness metric.

In some embodiments, determining the correctness metric for the first model output includes determining the correctness metric based on at least one of: (i) a probability of a highest-confidence class represented by the first model output, (ii) an entropy of a probability distribution represented by the first model output, (iii) a magnitude of a difference between a highest probability represented by the first model output and a second-highest probability represented by the first model output, (iv) a magnitude of a difference between a logit of a highest probability represented by the first model output and a logit of a second-highest probability represented by the first model output, (v) a conditional entropy bottleneck value of the first model output, or (vi) a cross entropy of the first model output In some embodiments, combining the first model output and the second model output to generate a combined output includes summing logit values of the first model output and logit values of the second model output.

In some embodiments, the first machine learning model and the second machine learning model have different model structures.

In some embodiments, the first machine learning model and the second machine learning model are the same convolutional neural network evaluated with different input sizes.

In some embodiments, the first machine learning model and the second machine learning model are associated with respective first and second computational costs, and the threshold has a value that has been determined based on the first and second computational costs such that the expected accuracy of an output of the method is increased while maintaining the expected computational cost of executing the method less than a specified computational cost.

In some embodiments, the first machine learning model and the second machine learning model are associated with respective first and second computational costs, and the threshold has a value that has been determined based on the first and second computational costs such that the expected computational cost of executing the method is reduced while maintaining the expected accuracy of an output of the method greater than a specified accuracy.

In some embodiments, the second machine learning model has been trained on a set of training examples that, when applied to a first machine learning model, result in the generation of outputs corresponding to sub-threshold correctness metric values.

In some embodiments, the method 400 additionally includes: (i) applying an additional input to the first machine learning model to generate a third model output; (ii) determining, based on the third model output, a correctness metric for the third model output, wherein the correctness metric for the third model output is indicative of a degree of confidence in the accuracy of the third model output; (iii) determining that the correctness metric for the third model exceeds the threshold; and (iv) responsive to determining that the correctness metric exceeds the threshold: (a) applying the additional input to the second machine learning model to generate a fourth model output; (b) determining, based on the fourth model output, a correctness metric for the fourth model output, wherein the correctness metric for the fourth model output is indicative of a degree of confidence in the accuracy of the fourth model output; (c) determining that the correctness metric for the fourth model exceeds an additional threshold; and (d) responsive to determining that the correctness metric for the fourth model output exceeds the additional threshold: (1) applying the additional input to a third machine learning model to generate a fifth model output; and (2) combining the third model output, the fourth model output, and the fifth model output to generate an additional combined output for the additional input.

V. EXPERIMENTAL RESULTS

Figure 5:
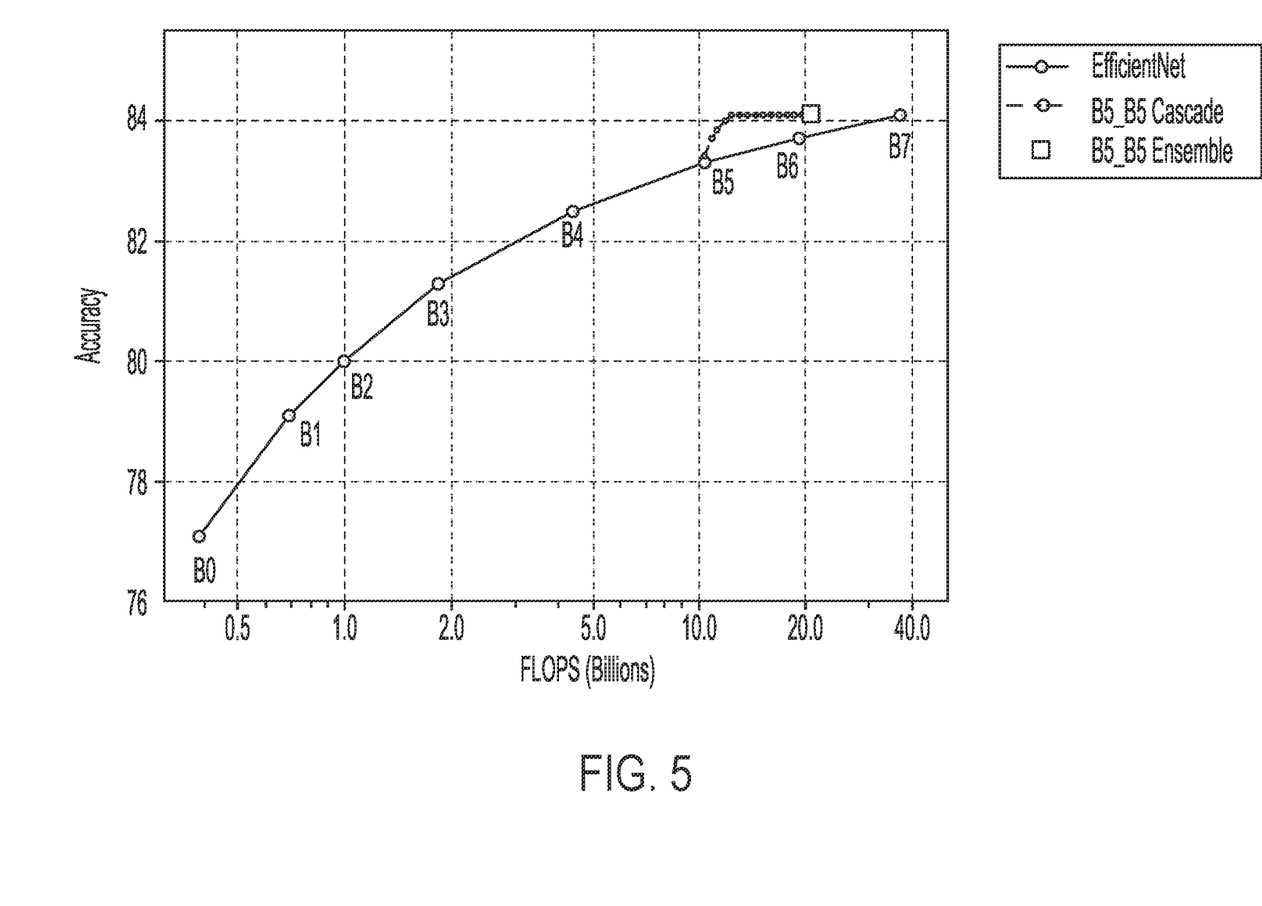
FIG. 5 illustrates example experimental results.

FIG. 5 depicts the accuracy as a function of computational cost of a variety of EfficientNet machine learning models and of cascades and ensembles of the B5 EfficientNet model. The various EfficientNet models (B0 through B7) represent increasing model complexity and corresponding increases in accuracy and computational cost. The performance of an ensemble of two B5 EfficientNet models has a slightly increased accuracy and computational cost relative to the B6 EfficientNet model. The performance of a cascade of two B5 EfficientNet models ("B5_B5 ensemble") with various levels selected for the conditional execution threshold is also shown. Thus, for very high threshold levels, the second model of the cascade will be very rarely executed, and so the expected accuracy and computational cost of the cascade are approximately equal to the accuracy and cost of the single B5 EfficientNet model. Conversely, for very low threshold levels, the second model of the cascade will be almost always executed, and so the expected accuracy and computational cost of the cascade are approximately equal to the accuracy and cost of the B5_B5 ensemble of EfficientNet models. Between these extremes, the expected accuracy and computational cost of the cascade of two B5 EfficientNet models increase in a nonlinear manner. As shown, this increase exhibits a knee at an intermediate threshold value, beyond which expected computational cost increases without substantial increases in expected accuracy. Thus, the threshold level can be set to a value near this knee to achieve substantially all of the accuracy benefits of the full B5_B5 ensemble with significantly less expected computational cost. In the data shown in FIG. 5, the cost of the B5_B5 ensemble is 20.5B Flops while the cost of the cascade, with the threshold value set at the 'knee,' is only 13.1 B Flops.

Figure 6:
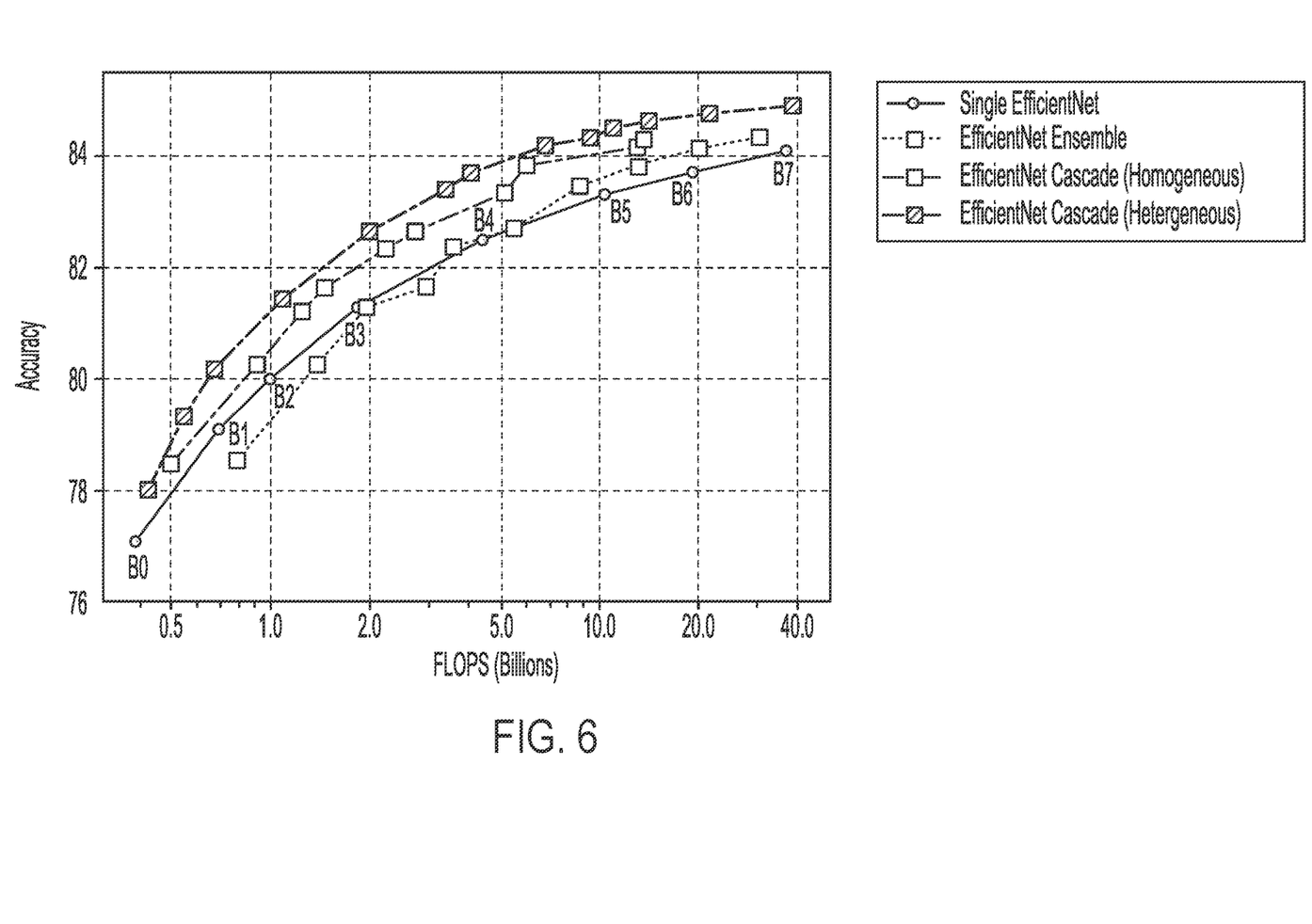
FIG. 6 illustrates example experimental results.

FIG. 6 depicts the accuracy as a function of computational cost of a variety of EfficientNet machine learning models and of cascades and ensembles thereof. As shown, ensembles of two EfficientNet models outperform single EfficientNet models for higher-numbered models. Cascade of two EfficientNet models of the same order outperform both single EfficientNet models and ensembles of two EfficientNet models. Cascades of two EfficientNet models of different orders outperform cascades of two EfficientNet models of the same order.

Figure 7A:
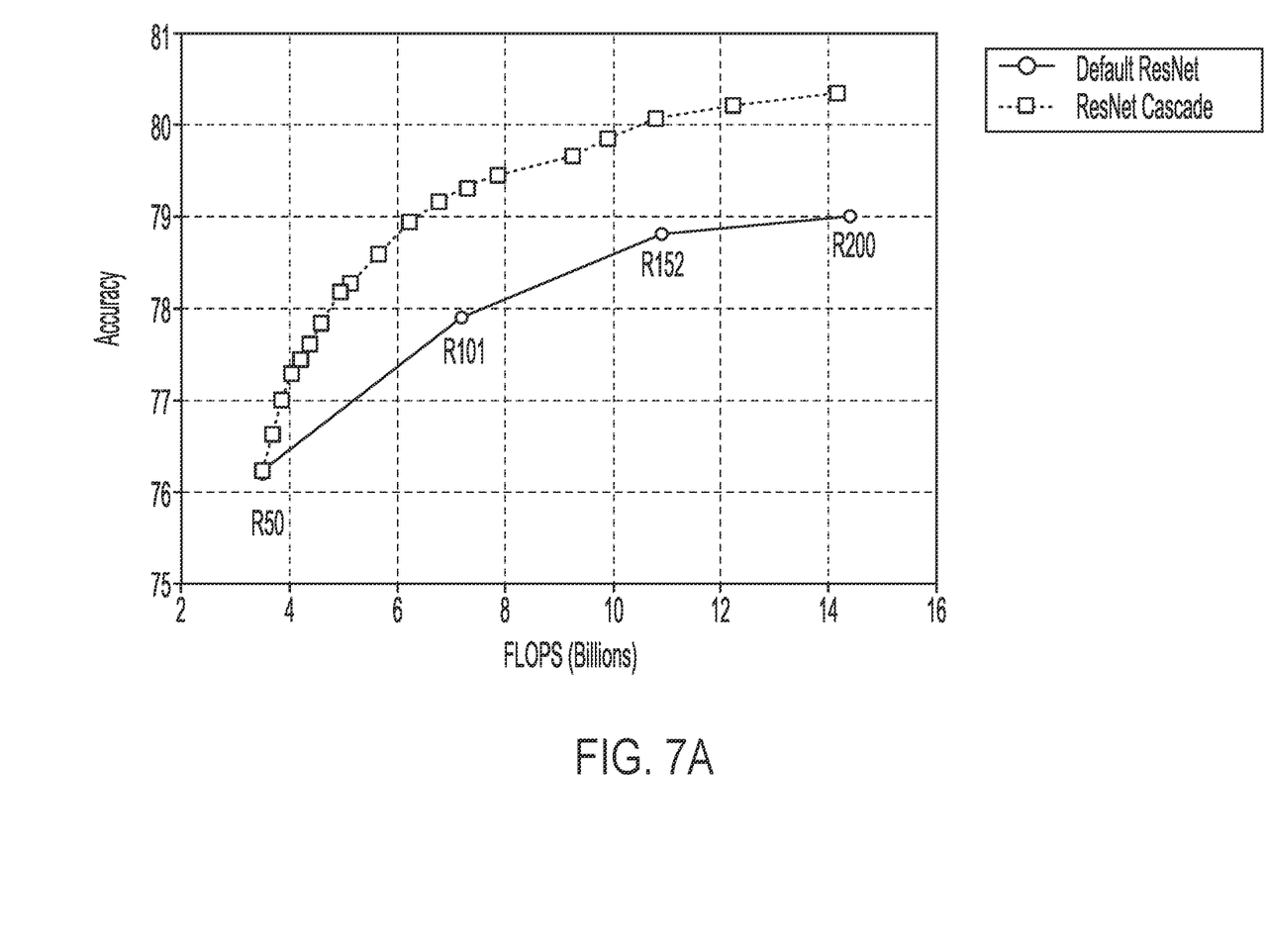
FIG. 7A illustrates example experimental results.

FIG. 7A depicts the accuracy as a function of computational cost of a variety of ResNet machine learning models and of cascades thereof. As shown, cascades of two ResNet models outperform single ResNet models.

Figure 7B:
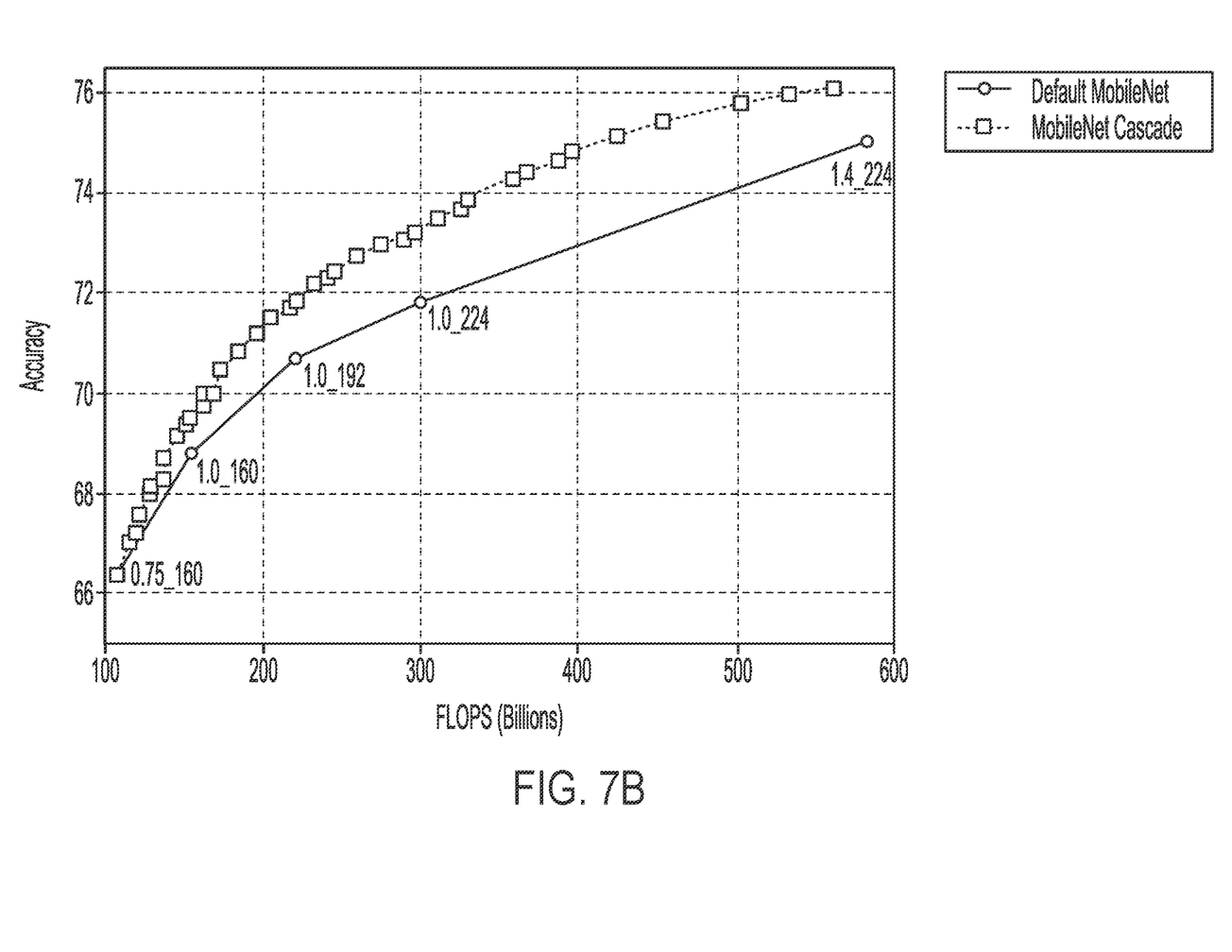
FIG. 7B illustrates example experimental results.

FIG. 7B depicts the accuracy as a function of computational cost of a variety of MobileNet machine learning models and of cascades thereof. As shown, cascades of two MobileNet models outperform single MobileNet models.

The model cascades described herein can be applied to image processing or image classification tasks. These model cascades can also be applied to other applications, e.g., video classification, semantic segmentation, etc.

Similar to image classification, a video classification model outputs a vector of logits over possible classes. The same procedure as image classification was applied to build cascades of video classification models. The X3D architecture family for video classification was assessed, which is the state-of-the-art in terms of both accuracy and efficiency. The X3D family contains a series of models of different sizes. Specifically, cascades of X3D models were built to match the FLOPS or accuracy of X3D-M, X3D-L or X3D-XL on the Kinetics-600 dataset. The results are summarized in Table 1 below.

TABLE 1

|  | Solitary models | | Cascades-Similar FLOPS | | | Cascades-Similar Accuracy | | |
| --- | --- | --- | --- | --- | --- | --- | --- | --- |
|  | Top-1 (%) | FLOPS (B) | Top-1 (%) | FLOPS (B) | ΔTop-1 | Top-1 (%) | FLOPS (B) | Speedup |
| X3D-M | 78.8 | 6.2 | 80.3 | 5.7 | 1.5 | 79.1 | 3.8 | 1.6× |
| X3D-L | 80.6 | 24.8 | 82.7 | 24.6 | 2.1 | 80.8 | 7.9 | 3.2× |
| X3D-XL | 81.9 | 48.4 | 83.1 | 38.1 | 1.2 | 81.9 | 13.0 | 3.7× |

The reported FLOPS in Table 1 are the inference cost for a single clip. 30 clips were sampled from each input video during inference.

As seen in the above table, model cascades significantly outperformed the original X3D models. For example, the model cascade as described herein outperformed X3D-L by 2.1% while costing similar FLOPS. The model cascade described herein matched the accuracy of X3D-XL with 3.7× fewer average FLOPS.

In semantic segmentation, the model predicts a vector of logits for each pixel in the image. This differs from image classification, where the model makes one single prediction for the entire image. Thus, the confidence function used in the model cascades was modified to handle such dense prediction tasks.

Similar to the image classification task, the maximum probability was used to measure the confidence of the prediction for a single pixel p, i.e., $g(\alpha_p)=\max(\text{softmax}(\alpha_p))$, where $\alpha_p$ is the predicted logits for pixel p. Next, a function $g^{dense}(\bullet)$ was used to rate the confidence of the dense prediction for an image, so that the determination can be made whether to apply the next model to an input image based on the confidence score. For this purpose, $g^{dense}(\bullet)$ was defined as the average confidence score of all the pixels in the image: $g^{dense}(R)=(1/|R|)\Sigma_{p \in R}g(\alpha_p)$, where R represents the input image.

Note that many pixels are unlabeled in semantic segmentation datasets, e.g., the Cityscapes dataset. These pixels were ignored during training and evaluation. These unlabeled pixels may introduce noise when average the confidence score of all the pixels are averaged. To filter out unlabeled pixels in the image, only pixels whose confidence is higher than a preset threshold $t^{unlab}$ were used. So update the definition of $g^{dense}(\cdot)$ was updated to: $g^{dense}(R)=(1/|R'|) \Sigma_{p \in R'} g(\alpha_p)$, where $R'=\{p|g(\alpha_p)>t^{unlab}, p \in R\}$.

In a cascade of segmentation models, it was determined whether to pass an image R to the next model based on $g^{dense}(\cdot)$. Since the difficulty in labeling different parts in a single image varies significantly, e.g., roads are easier to segment than traffic lights, making one decision for the entire image can be inaccurate and lead to the waste of computation. Therefore, in practice, images were divided into grids and it was decided whether to pass each grid to the next model separately.

Experiments were conducted using this expanded method on the Cityscapes image segmentation dataset and using mean IoU (IoU) as the metric. A cascade of DeepLabv3-ResNet-50 and DeepLabv3-ResNet-101 were created and assessed. The results of this assessment are reported in Table 2 below.

TABLE 2

|  | mIoU | FLOPS (B) | Speedup |
|---|---|---|---|
| ResNet-50 | 77.1 | 348 | — |
| ResNet-101 | 78.1 | 507 | — |
| Cascade - full | 78.4 | 568 | 0.9x |
| Cascade - r = 512 | 78.1 | 439 | 1.2x |
| Cascade - r = 128 | 78.2 | 398 | 1.3x | r is the size, in pixels, of the grids into which the images were divided. The full image resolution was 1024×2048, so r=512 results in each image being divided into 8 grids. It was observed that, if the model cascade were to operate on the full image level ('full'), the model cascade would use more FLOPS than ResNet-101. But, when operating on the grid level, the model cascade was able to successfully reduce the computation without hurting the performance. For example, the smaller grid size (r=128') yields 1.3× reduction in FLOPS while matching the mIoU of ResNet-101.

VI. CONCLUSION

The above detailed description describes various features and functions of the disclosed systems, devices, and methods with reference to the accompanying figures. In the figures, similar symbols typically identify similar components, unless the context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method comprising:
    applying a first machine learning model to an input to generate a first model output, wherein the first machine learning model has been trained on a first set of training examples;
    determining, based on the first model output, a correctness metric for the first model output;
    determining that the correctness metric exceeds a threshold, wherein the threshold has a value that has been determined for the first machine learning model and a second machine learning model based on a set of training inputs; and
    responsive to determining that the correctness metric exceeds the threshold:
    applying the second machine learning model to the input to generate a second model output, wherein the second machine learning model has been trained by (i) selecting, from the first set of training examples, a second set of training examples that, when applied to the first machine learning model, result in the generation of outputs corresponding to sub-threshold correctness metric values, and (ii) training the second machine learning model using the second set of training examples; and combining the first model output and the second model output to generate a combined output, wherein the combining comprises at least one of: summing of the first model output and the second model output, taking the mean of the first model output and the second model output, taking a mode of the first model output and the second model output, taking an average of the first model output and the second model output, taking a weighted average of the first model output and the second model output, performing an elementwise operation on the first model output and the second model output, voting based on the first model output and the second model output, or summing logit values of the first model output and logit values of the second model output.

2. The method of claim 1, wherein the input is an input image.

3. The method of claim 2, wherein the first machine learning model comprises a convolutional neural network.

4. The method of claim 2, wherein the first model output includes a version of the input image modified by the first machine learning model.

5. The method of claim 1, wherein the first model output is indicative of membership of the input in one or more classes from an enumerated set of classes.

6. The method of claim 1, wherein the first model output includes the correctness metric.

7. The method of claim 1, wherein determining the correctness metric for the first model output comprises determining the correctness metric based on at least one of: a probability of a highest-confidence class represented by the first model output, an entropy of a probability distribution represented by the first model output, a magnitude of a difference between a highest probability represented by the first model output and a second-highest probability represented by the first model output, a magnitude of a difference between a logit of a highest probability represented by the first model output and a logit of a second-highest probability represented by the first model output, a conditional entropy bottleneck value of the first model output, or a cross entropy of the first model output.

8. The method of claim 1, wherein combining the first model output and the second model output to generate a combined output comprises summing logit values of the first model output and logit values of the second model output.

9. The method of claim 1, wherein the first machine learning model and the second machine learning model have different model structures.

10. The method of claim 1, wherein the first machine learning model and the second machine learning model are the same convolutional neural network evaluated with different input sizes.

11. The method of claim 1, wherein the first machine learning model and the second machine learning model are associated with respective first and second computational costs, and wherein the threshold has a value that has been determined based on the first and second computational costs such that the expected accuracy of an output of the method is increased while maintaining the expected computational cost of executing the method less than a specified computational cost.

12. The method of claim 1, wherein the first machine learning model and the second machine learning model are associated with respective first and second computational costs, and wherein the threshold has a value that has been determined based on the first and second computational costs such that the expected computational cost of executing the method is reduced while maintaining the expected accuracy of an output of the method greater than a specified accuracy.

13. The method of claim 1, further comprising:
applying an additional input to the first machine learning model to generate a third model output;
determining, based on the third model output, a correctness metric for the third model output, wherein the correctness metric for the third model output is indicative of a degree of confidence in the accuracy of the third model output;
determining that the correctness metric for the third model exceeds the threshold; and
responsive to determining that the correctness metric exceeds the threshold:
applying the additional input to the second machine learning model to generate a fourth model output;
determining, based on the fourth model output, a correctness metric for the fourth model output, wherein the correctness metric for the fourth model output is indicative of a degree of confidence in the accuracy of the fourth model output;
determining that the correctness metric for the fourth model exceeds an additional threshold; and
responsive to determining that the correctness metric for the fourth model output exceeds the additional threshold:
applying the additional input to a third machine learning model to generate a fifth model output; and
combining the third model output, the fourth model output, and the fifth model output to generate an additional combined output for the additional input.

14. An article of manufacture including a non-transitory computer-readable medium, having stored therein instructions executable by a computing device to cause the computing device to perform a method comprising:
applying a first machine learning model to an input to generate a first model output, wherein the first machine learning model has been trained on a first set of training examples;
determining, based on the first model output, a correctness metric for the first model output;
determining that the correctness metric exceeds a threshold, wherein the threshold has a value that has been determined for the first machine learning model and a second machine learning model based on a set of training inputs; and
responsive to determining that the correctness metric exceeds the threshold:
applying the second machine learning model to the input to generate a second model output, wherein the second machine learning model has been trained by (i) selecting, from the first set of training examples, a second set of training examples that, when applied to the first machine learning model, result in the generation of outputs corresponding to sub-threshold correctness metric values, and (ii) training the second machine learning model using the second set of training examples; and
combining the first model output and the second model output to generate a combined output, wherein the combining comprises at least one of: summing of the first model output and the second model output, taking the mean of the first model output and the second model output, taking a mode of the first model output and the second model output, taking an average of the first model output and the second model output, taking a weighted average of the first model output and the second model output, performing an elementwise operation on the first model output and the second model output, voting based on the first model output and the second model output, or summing logit values of the first model output and logit values of the second model output.

15. The article of manufacture of claim 14, wherein the first machine learning model and the second machine learning model are the same convolutional neural network evaluated with different input sizes.

16. The article of manufacture of claim 14, wherein the first machine learning model and the second machine learning model are associated with respective first and second computational costs, and wherein the threshold has a value that has been determined based on the first and second computational costs such that one of: (i) the expected accuracy of an output of the method is increased while maintaining the expected computational cost of executing the method less than a specified computational cost, or (ii) the expected computational cost of executing the method is reduced while maintaining the expected accuracy of an output of the method greater than a specified accuracy.

17. A system comprising:
one or more processors; and
a non-transitory computer-readable medium, having stored therein instructions executable by the one or more processors to cause the system to perform a method comprising:
applying a first machine learning model to an input to generate a first model output, wherein the first machine learning model has been trained on a first set of training examples;
determining, based on the first model output, a correctness metric for the first model output;
determining that the correctness metric exceeds a threshold, wherein the threshold has a value that has been determined for the first machine learning model and a second machine learning model based on a set of training inputs; and
responsive to determining that the correctness metric exceeds the threshold:
applying the second machine learning model to the input to generate a second model output, wherein the second machine learning model has been trained by (i) selecting, from the first set of training examples, a second set of training examples that, when applied to the first machine learning model, result in the generation of outputs corresponding to sub-threshold correctness metric values, and (ii) training the second machine learning model using the second set of training examples; and
combining the first model output and the second model output to generate a combined output, wherein the combining comprises at least one of: summing of the first model output and the second model output, taking the mean of the first model output and the second model output, taking a mode of the first model output and the second model output, taking an average of the first model output and the second model output, taking a weighted average of the first model output and the second model output, performing an elementwise operation on the first model output and the second model output, voting based on the first model output and the second model output, or summing logit values of the first model output and logit values of the second model output.

18. The system of claim 17, wherein the first machine learning model and the second machine learning model are the same convolutional neural network evaluated with different input sizes.

19. The system of claim 17, wherein the first machine learning model and the second machine learning model are associated with respective first and second computational costs, and wherein the threshold has a value that has been determined based on the first and second computational costs such that one of: (i) the expected accuracy of an output of the method is increased while maintaining the expected computational cost of executing the method less than a specified computational cost, or (ii) the expected computational cost of executing the method is reduced while maintaining the expected accuracy of an output of the method greater than a specified accuracy.

* * * * *